(12) United States Patent
Hingne

(10) Patent No.: US 11,400,809 B2
(45) Date of Patent: Aug. 2, 2022

(54) METHOD FOR OPERATING A POWER TAKE-OFF SHAFT OF AN AGRICULTURAL TRACTOR WITH AN ATTACHMENT HOIST

(71) Applicant: DEERE & COMPANY, Moline, IL (US)

(72) Inventor: Abhijeet Hingne, Pune (IN)

(73) Assignee: DEERE & COMPANY, Moline, IL (US)

( * ) Notice: Subject to any disclaimer, the term of this patent is extended or adjusted under 35 U.S.C. 154(b) by 192 days.

(21) Appl. No.: 16/655,984

(22) Filed: Oct. 17, 2019

(65) Prior Publication Data

US 2020/0122574 A1 Apr. 23, 2020

(30) Foreign Application Priority Data

Oct. 22, 2018 (DE) .......................... 102018218063.6

(51) Int. Cl.
*B60K 25/06* (2006.01)
*B60W 30/188* (2012.01)
*A01B 63/10* (2006.01)

(52) U.S. Cl.
CPC .............. *B60K 25/06* (2013.01); *A01B 63/10* (2013.01); *B60K 2025/065* (2013.01); *B60W 30/1886* (2013.01)

(58) Field of Classification Search
CPC .. B60K 25/06; B60K 2025/065; A01B 63/10; A01B 71/06; A01B 71/02; B60W 30/1886
See application file for complete search history.

(56) References Cited

U.S. PATENT DOCUMENTS

| | | | | |
|---|---|---|---|---|
| 5,558,163 A | * | 9/1996 | Hollstein | A01B 67/00 172/2 |
| 6,092,013 A | * | 7/2000 | Stelzle | A01B 63/1117 180/53.6 |
| 6,123,155 A | * | 9/2000 | Hollstein | A01B 63/10 172/2 |

(Continued)

FOREIGN PATENT DOCUMENTS

| | | | | |
|---|---|---|---|---|
| CA | 2962674 C | * | 3/2019 | ........... A01D 41/141 |
| DE | 19754233 A1 | | 7/1999 | |

(Continued)

OTHER PUBLICATIONS

European Search Report issued in counterpart application No. 19202754.8 dated Apr. 20, 2020 (06 pages).

*Primary Examiner* — Karen Beck

(57) ABSTRACT

A method for operating a power take-off shaft of an agricultural tractor with an attachment hoist includes providing a power take-off shaft spatially assigned to the attachment hoist, a hoist controller and a control unit. The method also includes detecting an operating state of the power take-off shaft via a first sensor and an upper operating position of the attachment hoist via a second sensor. The method further includes restricting the upper operating position to a first maximum value by the control unit if the first sensor detects that the power take-off shaft is not operating, and restricting the upper operating position to a second maximum value by the control unit if the first sensor detects that the power take-off shaft is operating, where the second maximum value is less than the first maximum value.

20 Claims, 2 Drawing Sheets

(56) References Cited

U.S. PATENT DOCUMENTS

| | | | |
|---|---|---|---|
| 6,134,494 A * | 10/2000 | Stelzle | A01B 63/1117 172/2 |
| 6,205,385 B1 | 3/2001 | Stelzle et al. | |
| 2004/0201286 A1* | 10/2004 | Harvey | A01D 34/828 307/326 |
| 2008/0121402 A1 | 5/2008 | Ruckle et al. | |
| 2017/0036621 A1* | 2/2017 | Tieman | H01H 85/2015 |
| 2019/0389519 A1* | 12/2019 | Bergsten | B60K 25/06 |

FOREIGN PATENT DOCUMENTS

| | | | |
|---|---|---|---|
| EP | 0443325 A1 | 8/1991 |
| EP | 0920793 A2 | 6/1999 |
| EP | 1293113 A2 | 3/2003 |

\* cited by examiner

METHOD FOR OPERATING A POWER TAKE-OFF SHAFT OF AN AGRICULTURAL TRACTOR WITH AN ATTACHMENT HOIST

RELATED APPLICATIONS

This application claims priority to German Patent Application Ser. No. 102018218063.6, filed Oct. 22, 2018, the disclosure of which is hereby incorporated by reference in its entirety.

FIELD OF THE DISCLOSURE

The present disclosure relates to a method for operating a power take-off shaft of an agricultural tractor with an attachment hoist.

BACKGROUND

DE 197 54 233 A1 discloses a control apparatus for actuating a power take-off shaft control device of a utility vehicle with an attachment hoist which can be raised and lowered by actuation of a hoist operating element. In an automatic mode, the power take-off shaft control device automatically switches off the power take-off shaft at the instigation of the control apparatus in so far as a predefinable hoist position is exceeded during raising of the attachment hoist. In reverse, the power take-off shaft is automatically switched on again if a release operating element is actuated approximately simultaneously with a lowering command issued at the instigation of the hoist operating element. Operation of an attachment which is attached to the attachment hoist and is operated by a power take-off shaft can thus above all be significantly simplified when driving through a headland. Further aspects, in particular those relating to an improvement in the service life of drive components of the power take-off shaft, however, are not considered.

Thus, there is a need for a method for operating a power take-off shaft which leads to an improvement in the service life of the drive components of the power take-off shaft.

SUMMARY

In the present disclosure, a method is provided for operating a power take-off shaft of an agricultural tractor with an attachment hoist, a power take-off shaft spatially assigned to the attachment hoist, as well as first and second sensor means or mechanisms for providing operating information which characterizes an operating state of the power take-off shaft as well as an operating position of the attachment hoist. The method further provides that an upper operating position of the attachment hoist is restricted to a maximum admissible first maximum value $h_{1,max}$ by engagement in a hoist controller by a control unit on the basis of the provided operating information if the power take-off shaft is not in operation, and is restricted to a lower second maximum value $h_{2,max}$ in comparison with the first maximum value $h_{1,max}$ if the power take-off shaft is in operation.

By corresponding definition of the second maximum value $h_{2,max}$, excessive raising of an attachment attached to the attachment hoist during operation of the power take-off shaft and thus a misalignment which leads to increased drive loads on the drive components of the power take-off shaft are prevented or at least significantly reduced. These drive components include in particular a power take-off shaft transmission housing, a coupling provided on the output side as well as a power take-off shaft stub onto which the attachment is detachably coupled in terms of drive via a drive shaft.

The second maximum value $h_{2,max}$ ultimately depends on the geometry of the relevant attachment hoist as well as the spatial arrangement of the power take-off shaft with respect to the attachment hoist or the attachment attached thereto and is typically 25% to 50% of the first maximum value $h_{1,max}$. The first maximum value $h_{1,max}$ is produced from the maximum possible adjustment range of the attachment hoist.

A use of the method according to the present disclosure is expedient in particular in combination with a front power take-off shaft or a front attachment hoist since, in this case, the operator cannot generally see the current operating position of the attachment hoist from the driver's cabin. Unintentional maladjustment of the attachment hoist during operation of the power take-off shaft can be reliably avoided in this manner.

Undesirable operation of the power take-off shaft by the control unit is preferably prevented by engagement in a power take-off shaft controller as long as the attachment hoist is located in an operating position which exceeds the second maximum value $h_{2,max}$.

In this case, it is conceivable that, via an operator interface which is connected to the control unit, an indication is issued or signalled to the user to reduce the operating position of the attachment hoist in accordance with the second maximum value $h_{2,max}$. The issuing or signalling of the indication to the driver can be carried out in this case at the instigation of the control unit by actuation of corresponding display apparatuses or signal generators within the driver's cabin of the agricultural tractor by optical or acoustic means or mechanisms.

In order to relieve the strain on the driver as far as possible, it is additionally possible that the reduction corresponding to the second maximum value $h_{2,max}$ of the operating position of the attachment hoist is performed in an automated manner by engagement of the control unit in the hoist controller.

BRIEF DESCRIPTION OF THE DRAWINGS

The above-mentioned aspects of the present disclosure and the manner of obtaining them will become more apparent and the disclosure itself will be better understood by reference to the following description of the embodiments of the disclosure, taken in conjunction with the accompanying drawings, wherein.

Corresponding reference numerals are used to indicate corresponding parts throughout the several views.

DETAILED DESCRIPTION

The embodiments of the present disclosure described below are not intended to be exhaustive or to limit the disclosure to the precise forms disclosed in the following detailed description. Rather, the embodiments are chosen and described so that others skilled in the art may appreciate and understand the principles and practices of the present disclosure.

Figure 1:
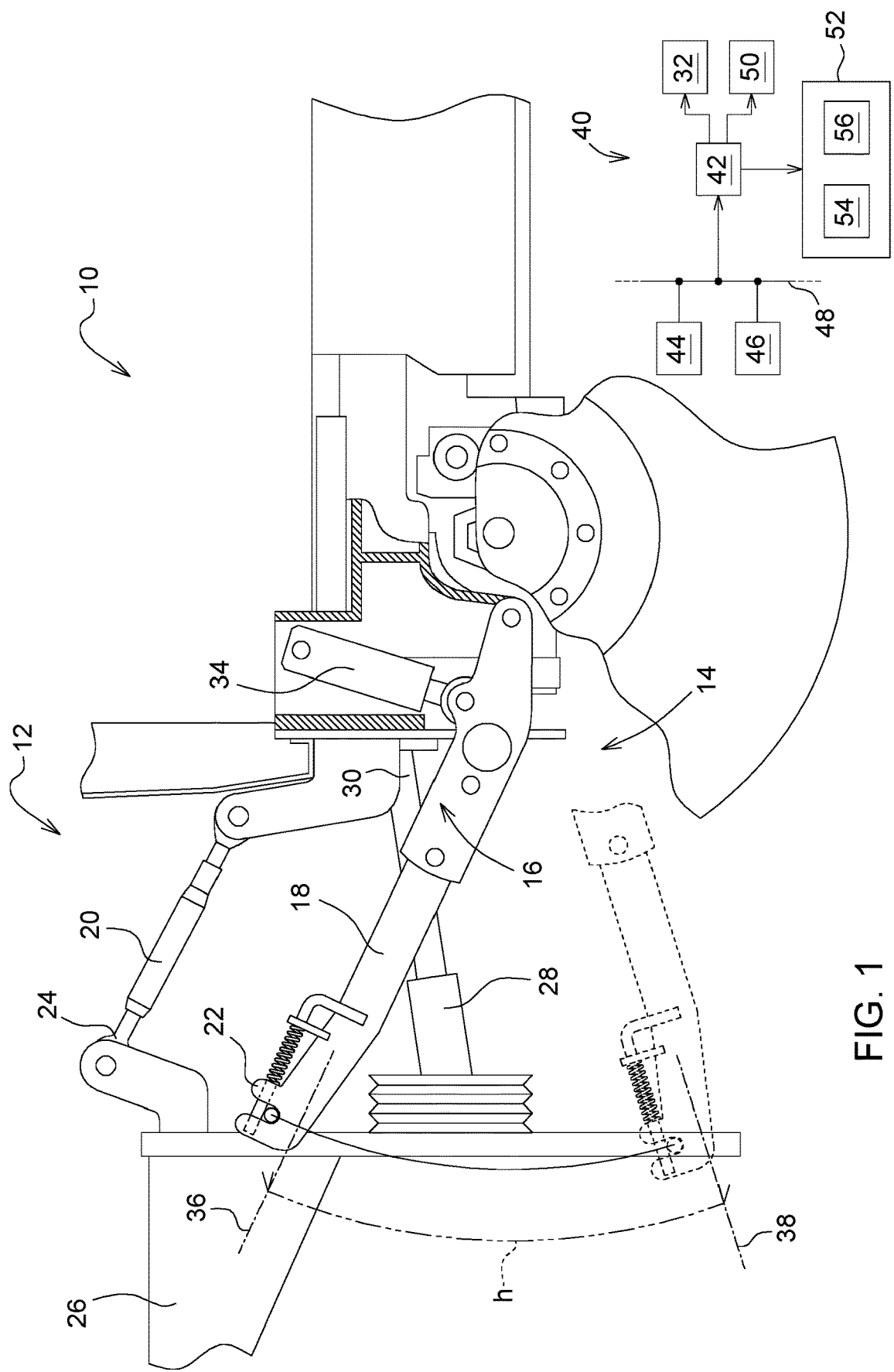
FIG. 1 shows an agricultural tractor with a device for carrying out the method according to the present disclosure.

FIG. 1 shows a schematic partial view of an agricultural tractor with a device for carrying out the method according to the present disclosure. By way of example, the agricultural tractor 10 comprises a front attachment hoist 14 formed as a front three-point power lift 12 as well as a front power take-off shaft 16 spatially assigned to the front attachment hoist 14. The power take-off shaft 16 runs centrally between right and left lower links 18 of the attachment hoist, wherein, on the grounds of illustration, only one of the two lower links 18 can be seen in FIG. 1. The lower links 18 and a central upper link 20 comprise coupling hooks 22, 24 for attachment of an agricultural attachment 26. The attachment 26 is, for example, a front mower or a rotary rake, wherein the attachment 26 is detachably coupled in terms of drive via a drive shaft 28 onto a power take-off shaft stump 30 encompassed by the power take-off shaft 16.

The lower links 18 can be pivoted vertically at the instigation of a hoist controller 32 by respectively assigned hydraulic cylinders 34 so that the attachment 26 can be raised into an upper operating position 36 when driving through a headland or for the purpose of transport and lowered into a lower operating position 38 for field working.

The device 40 accommodated in the agricultural tractor 10 has a microprocessor-controlled control unit 42 as well as first and second sensors 44, 46 for the provision of operating information which characterizes an operating state of the power take-off shaft 16 and an operating position of the attachment hoist 14. The operating information provided by the first sensor 44 represents in this case the current activation state of the power take-off shaft 16, whereas the operating information provided by the second sensor 46 reflects the scope of the vertical pivoting of the lower links 18. The corresponding operating information is supplied to the control unit 42 via a CAN data bus 48 for the purpose of evaluation.

As is apparent in FIG. 1, the control unit 42 furthermore communicates with the hoist controller 32 as well as a power take-off shaft controller 50 of the agricultural tractor 10. The first and second sensors 44, 46 can in this case be a component of the hoist controller 32 or the power take-off shaft controller 50.

A user interface 52 which is connected to the control unit 42 enables the output of an indication to the driver. The output of the indication to the driver can be carried out by actuation of corresponding display apparatuses 54 or signal generators 56 within a driver's cabin of the agricultural tractor 10 by optical or acoustic means or devices.

Figure 2:
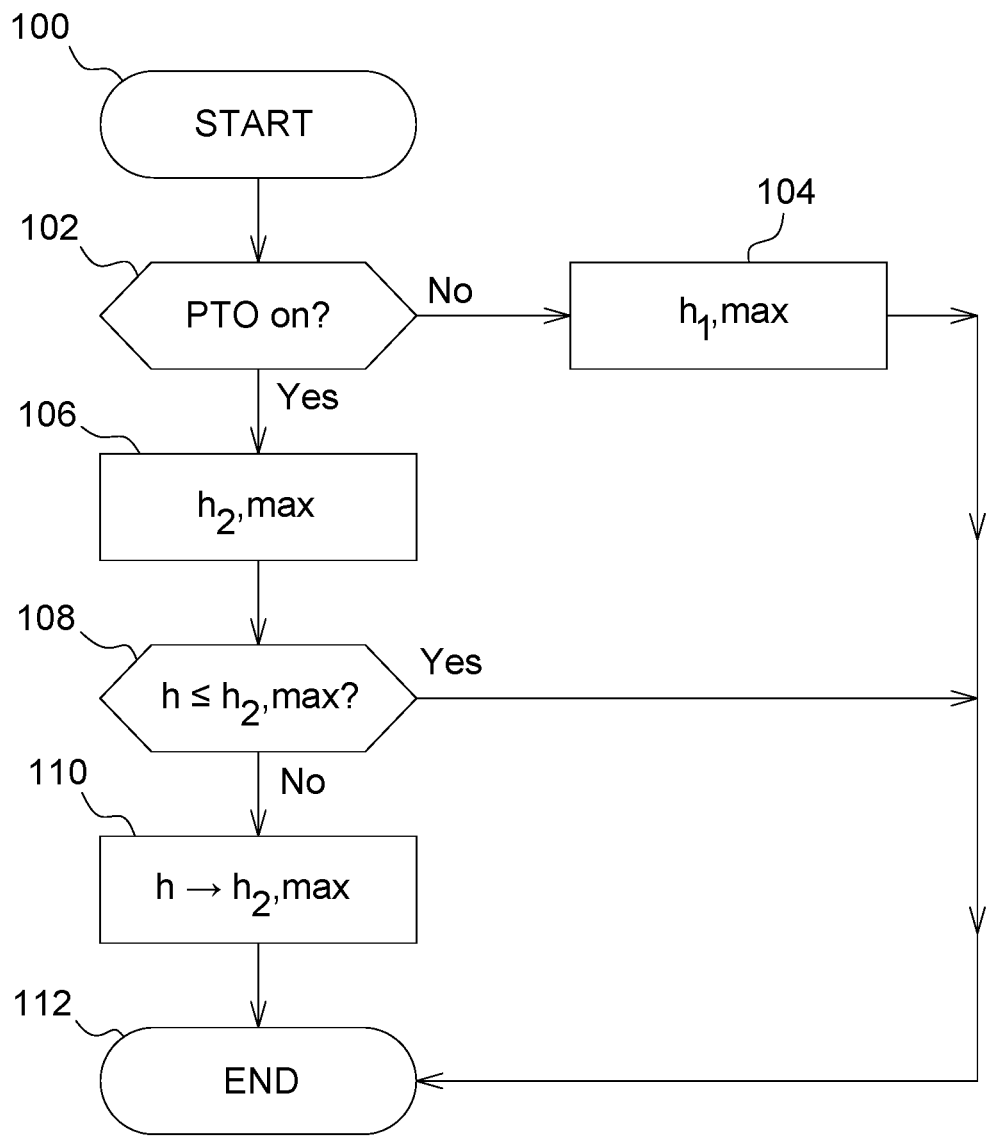
FIG. 2 shows an embodiment of the method in the form of a flow chart.

FIG. 2 shows an embodiment of the method according to the present disclosure in the form of a flow chart.

The method carried out by the control unit 42 is started in an initialization step 100 when starting up the agricultural tractor 10, whereupon the operating state of the power take-off shaft 16 (PTO or power take-off on) is checked on the basis of the operating information provided by the first sensor 44. If the control unit 42 ascertains that it is not in operation, in a second step 104, the upper operating position 36 of the attachment hoist 14 is restricted to a maximum admissible first maximum value $h_{1,max}$ by engagement in the hoist controller 32. The method is subsequently terminated in a final step 112.

If it emerges in the first step 102 that the power take-off shaft 16 is in operation, thus the attachment 26 performs a power take-off shaft-operated operating function, in a third step 106, the upper operating position 36 of the attachment hoist 14 is restricted to a lower second maximum value $h_{2,max}$ in comparison with the first maximum value $h_{1,max}$ by engagement in the hoist controller 32.

In a subsequent fourth step 108, the control unit 42 checks whether the current operating position h of the attachment hoist 14 is lower than or equal to the second maximum value $h_{2,max}$ ($h \leq h_{2,max}$). If this is the case, the method is terminated in the final step 112. Otherwise, one proceeds with a fifth step 110, in which, via the operator interface 52 which is connected to the control unit 42, an indication is issued to the user to reduce the operating position of the attachment hoist 14 in accordance with the second maximum value $h_{2,max}$. This is optionally carried out in an automated manner by engagement of the control unit 42 in the hoist controller 32. The method is subsequently terminated in the final step 112.

For the sake of completeness, it should be noted that a use of the method according to the present disclosure is not necessarily restricted to a front attachment hoist. On the contrary, this can also involve a rear attachment hoist in the form of a rear three-point power lift.

While embodiments incorporating the principles of the present disclosure have been disclosed hereinabove, the present disclosure is not limited to the disclosed embodiments. Instead, this application is intended to cover any variations, uses, or adaptations of the disclosure using its general principles. Further, this application is intended to cover such departures from the present disclosure as come within known or customary practice in the art to which this disclosure pertains and which fall within the limits of the appended claims.

The invention claimed is:

1. A method for operating a power take-off shaft of an agricultural tractor with an attachment hoist, comprising:
   providing a power take-off shaft spatially assigned to the attachment hoist, a hoist controller and a control unit;
   detecting an operating state of the power take-off shaft via a first sensor;
   detecting an upper operating position of the attachment hoist via a second sensor;
   restricting the upper operating position to a first maximum value by the control unit if the first sensor detects that the power take-off shaft is not operating; and
   restricting the upper operating position to a second maximum value by the control unit if the first sensor detects that the power take-off shaft is operating, where the second maximum value is less than the first maximum value.

2. The method of claim 1, further comprising engaging the hoist controller by the control unit during the restricting steps.

3. The method of claim 1, further comprising:
   determining the attachment hoist is located in an operating position which exceeds the second maximum value; and
   preventing operation of the power take-off shaft by the control unit.

4. The method of claim 3, wherein the preventing step comprises preventing operation of the power take-off shaft as long as the attachment hoist is located in the operating step which exceeds the second maximum value.

5. The method of claim 3, further comprising sending an instruction to an operator interface by the control unit to reduce the operating position of the attachment hoist to a position in accordance with the second maximum value.

6. The method of claim 5, further comprising lowering the attachment hoist automatically by the control unit.

7. The method of claim 5, further comprising sending a command by the control unit to the hoist controller to lower the attachment hoist to a position corresponding to the second maximum value.

8. The method of claim 1, further comprising communicating the operating state of the power take-off shaft via the first sensor to the control unit via a CAN data bus.

9. The method of claim 1, further comprising communicating the operating position of the attachment hoist via the second sensor to the control unit via a CAN data bus.

10. The method of claim 1, further comprising providing a power take-off shaft controller in electrical communication with the control unit.

11. An agricultural tractor, comprising:
an attachment hoist;
a power take-off shaft operably coupled to the attachment hoist;
a control unit for controlling the tractor;
a first sensor disposed in electrical communication with the control unit, the first sensor configured to detect an operating state of the power take-off shaft;
a second sensor disposed in electrical communication with the control unit, the second sensor configured to detect an operating position of the hoist;
wherein the control unit receives the operating state of the power take-off shaft from the first sensor and the operating position of the hoist from the second sensor;
further wherein the control unit operably restricts an upper operating position of the hoist to a first maximum value if the power take-off shaft is not operating, and the control unit operably restricts the upper operating position of the hoist to a second maximum value if the power take-off shaft is operating, where the second maximum value is less than the first maximum value.

12. The tractor of claim 11, wherein the hoist comprises a pair of lower links and an upper link, the power take-off shaft running between the pair of lower links.

13. The tractor of claim 12, wherein the pair of lower links and upper link comprise hooks for coupling to an agricultural implement.

14. The tractor of claim 13, wherein the pair of lower links are pivotally driven via hydraulic cylinders to move the implement to an upper operating position or a lowered operating position.

15. The tractor of claim 11, further comprising a user interface operably coupled to the control unit, the control unit communicating with the user interface to lower the hoist to a desired position.

16. The tractor of claim 11, further comprising a hoist controller operably coupled to the control unit for controlling the operating position of the hoist.

17. The tractor of claim 16, wherein the hoist controller comprises the first sensor and the second sensor.

18. The tractor of claim 11, further comprising a power take-off control operably coupled to the control unit for controlling the operational state of the power take-off shaft.

19. The tractor of claim 11, wherein the operating position of the hoist is automatically controlled by the control unit based on signals from the first sensor and the second sensor.

20. A method for operating a power take-off shaft of an agricultural tractor with an attachment hoist, comprising:
providing a power take-off shaft, a control unit, a first sensor, a second sensor, a user interface, a hoist controller, and a power take-off shaft controller;
operably controlling an operating position of the hoist via the hoist controller and an operating state of the power take-off shaft via the power take-off shaft controller;
detecting the operating state of the power take-off shaft via the first sensor;
detecting the upper operating position of the attachment hoist via the second sensor;
providing a first value and a second value corresponding to different operating positions of the hoist, the first value being greater than the second value;
restricting the operating position of the hoist to the first value by the control unit if the first sensor detects that the power take-off shaft is not operating; and
restricting the operating position to the second value by the control unit if the first sensor detects that the power take-off shaft is operating.

* * * * *